US012811197B2

(12) United States Patent
Shim

(10) Patent No.: US 12,811,197 B2
(45) Date of Patent: Nov. 24, 2026

(54) LITHIUM SECONDARY BATTERY

(71) Applicant: SK ON CO., LTD., Seoul (KR)

(72) Inventor: You Jin Shim, Daejeon (KR)

(73) Assignee: SK On Co., Ltd., Seoul (KR)

( * ) Notice: Subject to any disclaimer, the term of this patent is extended or adjusted under 35 U.S.C. 154(b) by 896 days.

(21) Appl. No.: 18/072,995

(22) Filed: Dec. 1, 2022

(65) Prior Publication Data

US 2023/0178814 A1 Jun. 8, 2023

(30) Foreign Application Priority Data

Dec. 2, 2021 (KR) ........................ 10-2021-0170639

(51) Int. Cl.

| | |
|---|---|
| ***H01M 10/0569*** | (2010.01) |
| ***H01M 4/02*** | (2006.01) |
| ***H01M 4/38*** | (2006.01) |
| ***H01M 4/505*** | (2010.01) |
| ***H01M 4/525*** | (2010.01) |
| ***H01M 10/052*** | (2010.01) |
| ***H01M 10/0567*** | (2010.01) |
| ***H01M 10/0568*** | (2010.01) |

(52) U.S. Cl.
CPC ....... *H01M 10/0569* (2013.01); *H01M 4/386* (2013.01); *H01M 4/505* (2013.01); *H01M 4/525* (2013.01); *H01M 10/052* (2013.01); *H01M 10/0567* (2013.01); *H01M 10/0568* (2013.01); *H01M 2004/027* (2013.01); *H01M 2004/028* (2013.01); *H01M 2300/0037* (2013.01); *H01M 2300/0051* (2013.01)

(58) Field of Classification Search
CPC ........ H01M 4/50; H01M 4/525; H01M 4/505; H01M 4/52; H01M 2300/0028
See application file for complete search history.

(56) References Cited

U.S. PATENT DOCUMENTS

| | | | | |
|---|---|---|---|---|
| 10,971,712 | B2 | 4/2021 | Torita et al. | |
| 11,996,522 | B2 * | 5/2024 | Kuwajima ........ | H01M 10/0568 |
| 2021/0119258 | A1 * | 4/2021 | Zou ........................ | H01M 4/525 |
| 2021/0159541 | A1 | 5/2021 | Jeong et al. | |
| 2022/0021020 | A1 * | 1/2022 | Liang ................ | H01M 10/0585 |
| 2022/0123366 | A1 * | 4/2022 | Jiang ................ | H01M 10/0525 |

FOREIGN PATENT DOCUMENTS

| | | | | |
|---|---|---|---|---|
| JP | H09147910 | A | 6/1997 | |
| KR | 1020000040642 | A | 7/2000 | |
| KR | 1020190119615 | A | 10/2019 | |
| KR | 1020200068309 | A | 6/2020 | |
| KR | 1020210008355 | A1 | 1/2021 | |
| KR | 1020210031158 | A | 3/2021 | |
| WO | WO-2019220764 | A1 * | 11/2019 | ........ H01M 10/0569 |
| WO | WO-2021057278 | A1 * | 4/2021 | ........ H01M 10/0585 |

* cited by examiner

*Primary Examiner* — Nicholas A Smith
(74) *Attorney, Agent, or Firm* — The Webb Law Firm

(57) ABSTRACT

A lithium secondary battery includes a cathode including a cathode active material that includes lithium metal oxide particles, an anode facing the cathode and including an anode active material, and an electrolyte solution including a lithium salt and an organic solvent. The lithium metal oxide particles contain at least 80 mol % of nickel and less than 10 mol % of manganese among all elements excluding lithium and oxygen. The organic solvent includes an acetate-based compound in an amount from 1 vol % to 10 vol % based on a total volume of the organic solvent.

11 Claims, 1 Drawing Sheet

LITHIUM SECONDARY BATTERY

CROSS-REFERENCE TO RELATED APPLICATION

This application claims priority to Korean Patent Application No. 10-2021-0170639, filed Dec. 2, 2021, the disclosure of which is hereby incorporated by reference in its entirety.

BACKGROUND OF THE INVENTION

1. Field of the Invention

The present invention relates to a lithium secondary battery. More particularly, the present invention relates to a lithium secondary battery including a cathode that includes a cathode active material containing lithium metal oxide particles, an anode and an electrolyte.

2. Description of Related Art

A secondary battery which can be charged and discharged repeatedly has been widely employed as a power source of an electric vehicle, a mobile electronic device such as a camcorder, a mobile phone, a laptop computer, etc.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer interposed between the cathode and the anode, and an electrolyte solution immersing the electrode assembly. The lithium secondary battery may further include an outer case for accommodating the electrode assembly and the electrolyte.

For example, the cathode may include a cathode current collector and a cathode active material layer including a cathode active material formed on the cathode current collector.

For example, the cathode active material may include lithium metal oxide particles capable of reversibly intercalating and de-intercalating lithium. For example, the lithium metal oxide particles may include a metal element such as nickel, cobalt, manganese, etc.

As an application of the lithium secondary battery is expanded, high capacity and life-span properties are required. For example, as the lithium secondary battery is applied to the electric vehicle, developments of the lithium secondary battery having improved rapid charging and life-span properties are required.

Korean Patent Laid-Open Publication No. 10-2019-0119615 discloses a method of improving battery properties by adding an additive to an electrolyte solution for a lithium secondary battery.

SUMMARY OF THE INVENTION

According to an aspect of the present invention, there is provided a lithium secondary battery providing improved capacity and life-span.

A lithium secondary battery includes a cathode including a cathode active material that includes lithium metal oxide particles, an anode facing the cathode and including an anode active material, and an electrolyte solution including a lithium salt and an organic solvent. The lithium metal oxide particles contain at least 80 mol % of nickel and less than 10 mol % of manganese among all elements excluding lithium and oxygen. The organic solvent includes an acetate-based compound represented by Chemical Formula 1 in an amount from 1 vol % to 10 vol % based on a total volume of the organic solvent.

[Chemical Formula 1 ]

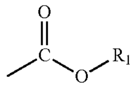

In Chemical Formula 1, $R_1$ represents a $C_1$-$C_{10}$ alkyl group, a $C_2$-$C_{10}$ alkenyl group, a $C_3$-$C_{12}$ cycloalkyl group, or a $C_5$-$C_{12}$ cycloalkenyl group.

In some embodiments, the lithium metal oxide particles may contain 88 mol % to 98 mol % of nickel among all elements excluding lithium and oxygen.

In some embodiments, the lithium metal oxide particles may contain 0.5 mol % to 7 mol % of manganese among all elements excluding lithium and oxygen.

In some embodiments, the lithium salt may include a fluorine-containing sulfonyl imide-based lithium salt represented by Chemical Formula 2.

[Chemical Formula 2]

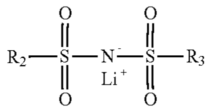

In Chemical Formula 2, $R_2$ and $R_3$ are independently fluorine or a fluorine-substituted $C_1$-$C_6$ alkyl group.

In some embodiments, in Chemical Formula 1, $R_1$ may be a $C_1$-$C_6$ alkyl group.

In some embodiments, a content of the acetate-based compound in the organic solvent may be in a range from 1 vol % to 5 vol %.

In some embodiments, the organic solvent may further include a cyclic carbonate-based solvent and a linear carbonate-based solvent.

In some embodiments, a content of the linear carbonate-based solvent in the organic solvent may be greater than a content of the cyclic carbonate-based solvent.

In some embodiments, a volume ratio of the cyclic carbonate-based solvent to the acetate-based compound in the organic solvent may be in a range from 2.5 to 25.

In some embodiments, the electrolyte solution may further include an additive comprising at least one of a fluorine-containing cyclic carbonate-based compound represented by Chemical Formula 3 and a sultone-based compound represented by Chemical Formula 4.

[Chemical Formula 3]

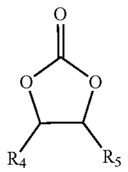

In Chemical Formula 3, $R_4$ and $R_5$ are independently hydrogen, halogen, or a $C_1$-$C_3$ alkyl group, and at least one of $R_4$ and $R_5$ is F.

[Chemical Formula 4]

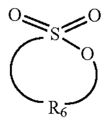

In Chemical Formula 4, $R_6$ is a $C_2$-$C_5$ alkylene group or a $C_3$-$C_5$ alkenylene group.

In some embodiments, a content of the additive may be in a range from 0.1 wt % to 5 wt % based on a total weight of the electrolyte solution.

In some embodiments, a content of the fluorine-containing cyclic carbonate-based compound may be in a range from 0.1 wt % to 2 wt % based on a total weight of the electrolyte solution, and a content of the sultone-based compound may be in a range from 0.1 wt % to 1 wt % based on the total weight of the electrolyte solution.

In some embodiments, the anode active material may include a silicon-based active material.

In some embodiments, a content of silicon atoms in the anode active material may be in a range from 1 wt % to 20 wt %.

A lithium secondary battery according to exemplary embodiments may include a cathode active material including lithium metal oxide particles containing nickel and manganese in predetermined contents, and an electrolyte solution containing an acetate-based compound represented by Chemical Formula 1. The lithium secondary battery may have improved capacity, rapid charging, life-span and high-temperature storage properties. Further, the lithium secondary battery may have suppressed increasing ratio of initial resistance and high-temperature storage resistance.

DESCRIPTION OF THE INVENTION

The term "Ca-Cb" used herein may indicate that the number of carbon atoms is from a to b.

According to embodiments of the present invention, a lithium secondary battery including a cathode active material that includes lithium metal oxide particles containing nickel and manganese in predetermined contents, and an electrolyte solution including an acetate-based compound represented by Chemical Formula 1 to be described later is provided.

Figure 1:
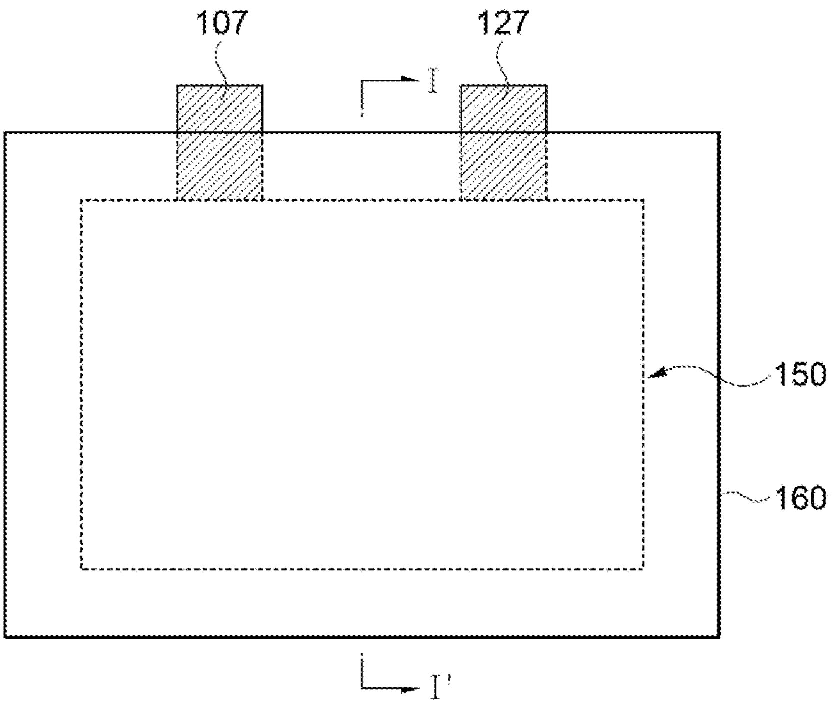
FIG. 1 is a schematic plan view illustrating a lithium secondary battery in accordance with exemplary embodiments.
Figure 2:
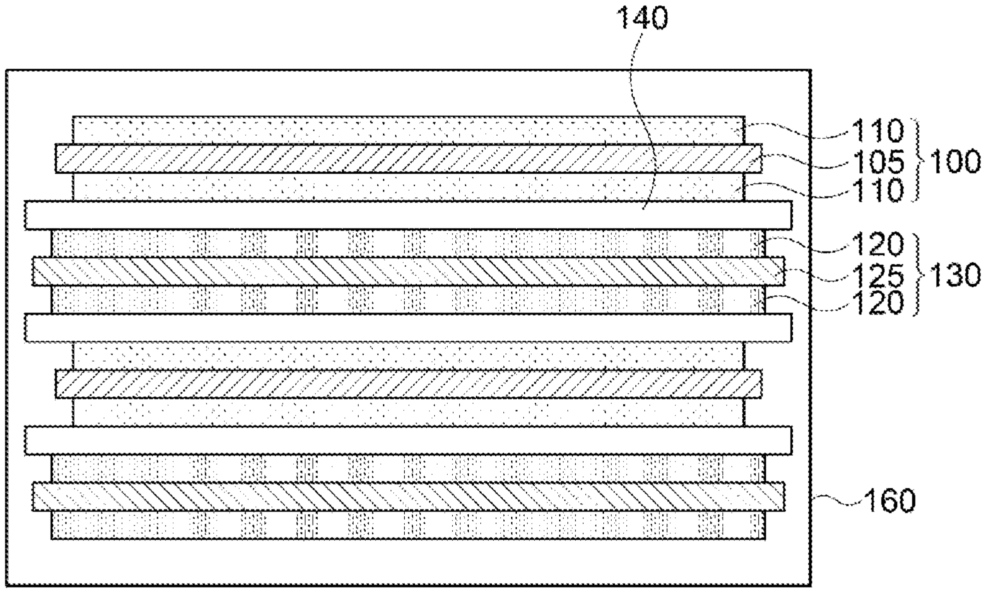
FIG. 2 are a schematic cross-sectional view illustrating a lithium secondary battery in accordance with exemplary embodiments.

Referring to FIGS. 1 and 2 are a schematic plan view and a cross-sectional view, respectively, of a lithium secondary battery according to exemplary embodiments. FIG. 2 is a cross-sectional view taken along a line I-I' of FIG. 1.

Referring to FIGS. 1 and 2, a lithium secondary battery includes an electrode assembly 150 including a cathode 100 and an anode 130 facing the cathode 100, and an electrolyte solution (not illustrated) impregnating the electrode assembly 150.

For example, the lithium secondary battery may include a case 160 accommodating the electrode assembly 150 and the electrolyte solution.

In an embodiment, a separation layer 140 may be interposed between the anode 100 and the cathode 130. For example, the electrode assembly 150 may be formed by winding, stacking or z-folding of the separation layer 140.

The electrolyte solution may include a lithium salt and an organic solvent. For example, the organic solvent may have a sufficient solubility for the lithium salt.

The organic solvent may include an acetate-based compound represented by Chemical Formula 1 below.

[Chemical Formula 1 ]

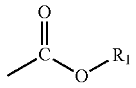

In Chemical Formula 1, $R_1$ may be a $C_1$-$C_{10}$ alkyl group, a $C_2$-$C_{10}$ alkenyl group, a $C_3$-$C_{12}$ cycloalkyl group or a $C_5$-$C_{12}$ cycloalkenyl group.

For example, the alkyl group and the alkenyl group may be linear or branched. (if branched, the carbon number is 3 or more).

In an embodiment, $R_1$ may be a C1-C6 alkyl group.

For example, the lithium secondary battery may include the acetate-based compound and lithium metal oxide particles containing predetermined amounts of nickel and manganese as will be described later, and may have improved capacity, rapid charging, life-span and high-temperature storage properties. Additionally, the lithium secondary battery may have a reduced initial resistance and a reduced increasing ratio of a high-temperature storage resistance.

In some embodiments, an amount of the acetate-based compound may be in a range from 1 volume percent (vol %) to 10 vol %, preferably from 1 vol % to 5 vol % based on a total volume of the organic solvent. If the amount of the acetate-based compound in the organic solvent exceeds 10 vol %, high-temperature storage life-span properties of the lithium secondary battery may be deteriorated, and an increasing ratio of the high-temperature storage resistance may be increased.

In an embodiment, the organic solvent may further include a carbonate-based solvent.

In some embodiments, the carbonate-based solvent may include a cyclic carbonate-based solvent and a linear carbonate-based solvent. For example, the cyclic carbonate-based solvent may have a 5 to 7-membered cyclic structure.

In some embodiments, an amount of the linear carbonate-based solvent in the organic solvent may be greater than that of the cyclic carbonate-based solvent.

In some embodiments, a volume ratio of the linear carbonate-based solvent relative to the cyclic carbonate-based solvent in the organic solvent may be greater than 1, and 9 or less, in a range from 2 to 7.5, or in a range from 2 to 3.5.

In some embodiments, a volume ratio of the cyclic carbonate-based solvent relative to the acetate-based compound in the organic solvent may be in a range from 2.5 to 25, or in a range from 5.5 to 25.

In some embodiments, the organic solvent may further include an ester-based (carboxylate-based) solvent, an ether-based solvent, a ketone-based solvent, an alcohol-based solvent, etc.

For example, the ester solvent may include methyl acetate (MA), ethyl acetate (EA), n-propyl acetate (n-PA), 1,1-dimethylethyl acetate (DMEA), methyl propionate (MP), ethyl propionate (EP), etc. These may be used alone or in combination thereof.

For example, the ether solvent may include dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc. These may be used alone or in combination thereof.

For example, the ketone-based solvent may include cyclohexanone, etc. For example, the alcohol-based solvent may include ethyl alcohol, isopropyl alcohol, etc.

The lithium salt may be represented by $Li^+X^-$. For example, the anion $X^-$ may be any one selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In an embodiment, the lithium salt may be included in a concentration from 0.1M to 5M, preferably from 0.1 M to 2M in the organic solvent.

In an embodiment, the lithium salt may include a fluorine-containing sulfonyl imide-based lithium salt. In this case, the rapid charging life-span and high temperature storage life-span properties of the lithium secondary battery may be further improved. Additionally, the increasing ratio of the high-temperature storage resistance of the lithium secondary battery may be further lowered.

For example, the fluorine-containing sulfonyl imide-based lithium salt may include a sulfonyl imide group, and a fluorine atom may be directly bonded to a sulfur atom of a sulfonyl group, or an alkyl group to which a fluorine atom is bonded (e.g., —$CF_3$, etc.) may be combined with to the sulfur atom of the sulfonyl group In some embodiments, the fluorine-containing sulfonyl imide-based lithium salt may be represented by Chemical Formula 2 below.

[Chemical Formula 2]

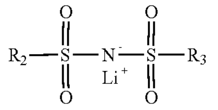

In Chemical Formula 2, $R_2$ and $R_3$ may independently represent fluorine or a fluorine-substituted $C_1$-$C_6$ alkyl group. For example, the fluorine-substituted $C_1$-$C_6$ alkyl group may include —$CF_3$, —$C_2F_5$, —$C_3F_8$, etc.

In some embodiments, the fluorine-containing sulfonyl imide-based lithium salt may include $LiN(SO_2F)_2$, $LiN(SO_2CF_3)_2$, $LiN(SO_2C_2F_5)_2$, etc.

In some embodiments, the fluorine-containing sulfonyl imide-based lithium salt may be included in a concentration from 0.1 M to 1M, or from 0.1 M to 0.5M in the organic solvent.

In an embodiment, the electrolyte may further include an additive including at least one of a fluorine-containing carbonate-based compound and a sultone-based compound. In this case, the high-temperature storage life-span properties of the lithium secondary battery may be further improved.

In some embodiments, a content of the additive may be in a range from 0.1 wt % to 5 wt % based on a total weight of the electrolyte.

For example, the fluorine-containing carbonate-based compound may include a fluorine atom or an alkyl group (e.g., —$CF_3$) to which a fluorine atom is bonded.

In an embodiment, the fluorine-containing carbonate-based compound may have a cyclic structure. For example, the fluorine-containing carbonate-based compound may have a 5 to 7-membered cyclic structure.

In an embodiment, the fluorine-containing carbonate-based compound may be represented by Chemical Formula 3 below.

[Chemical Formula 3]

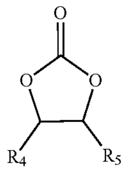

In Chemical Formula 3, $R_4$ and $R_5$ may independently be hydrogen, halogen or a $C_1$-$C_3$ alkyl group (provided that at least one of $R_4$ and $R_5$ is F).

In some embodiments, the fluorine-containing carbonate-based compound may include fluoroethylene carbonate (FEC), etc.

In some embodiments, a content of the fluorine-containing cyclic carbonate-based compound may be in a range from 0.1 wt % to 2 wt %, from 0.1 wt % to 1.5 wt %, or 0.1 wt % to 1 wt % based on the total weight of the electrolyte.

For example, the sultone-based compound may have a 5 to 7-membered cyclic structure.

In an embodiment, the sultone-based compound may be represented by Chemical Formula 4 below.

[Chemical Formula 4]

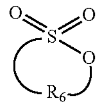

In Chemical Formula 4, $R_6$ may be a $C_2$-$C_5$ alkylene group or a $C_3$-$C_5$ alkenylene group.

In some embodiments, $R_6$ may be a $C_2$-$C_5$ alkylene group.

In some embodiments, a content of the sultone-based compound may be in a range from 0.1 wt % to 1.5 wt %, from 0.1 wt % to 1 wt %, or from 0.1 wt % to 0.5 wt % based on the total weight of the electrolyte.

In some embodiments, the sultone-based compound may include 1,3-propane sultone (PS), 1,4-butane sultone, ethensultone, 1,3-propene sultone (PRS), 1,4-butene sultone, 1-methyl-1,3-propene sultone, etc. These may be used alone or in a combination thereof.

In some embodiments, the additive may further include a fluorine-containing phosphate-based compound, a sulfate-based compound, a borate-based compound, etc.

For example, a fluorine atom may be directly bonded to a phosphorus atom included in the fluorine-containing phosphate compound, or an alkyl group to which a fluorine atom is bonded may be bonded to the phosphorus atom included in the fluorine-containing phosphate compound.

In some embodiments, the fluorine-containing phosphate-based compound may include lithium difluorophosphate ($LiPO_2F_2$), lithium tetrafluorooxalate phosphate, lithium difluoro(bisoxalato)phosphate, etc. These may be used alone or in a combination thereof.

For example, the sulfate-based compound may have a cyclic structure. For example, the sulfate-based compound may have a 5 to 7-membered cyclic structure.

In some embodiments, the sulfate-based compound may include ethylene sulfate (ESA), trimethylene sulfate (TMS), methyltrimethylene sulfate (MTMS), etc. For example, the borate-based compound may include lithium tetraphenyl borate, lithium difluoro(oxalato) borate (LiODFB), etc. These may be used alone or in a combination thereof.

The cathode 100 may include a cathode current collector 105 and a cathode active material layer 110 formed on the cathode current collector 105.

For example, the cathode active material layer 110 may include a cathode active material, and may further include a cathode binder and a conductive material.

For example, a cathode slurry may be prepared by mixing and stirring the cathode active material, the cathode binder, the conductive material, a dispersive agent, etc. The cathode slurry may be coated on the cathode current collector 105, and then dried and pressed to form the cathode 100.

The cathode current collector 105 may include, e.g., stainless-steel, nickel, aluminum, titanium, copper or an alloy thereof.

For example, the cathode active material may include lithium metal oxide particles capable of reversibly intercalating and de-intercalating lithium ions. In exemplary embodiments, the cathode active material may include the lithium metal oxide particles containing nickel. In some embodiments, the lithium metal oxide particles may further include at least one of cobalt and manganese.

For example, the lithium metal oxide particles may further include cobalt and manganese.

In an embodiments, the lithium metal oxide particles may contain 80 mol % or more of nickel based on a total number of moles of all elements excluding lithium and oxygen. In some embodiments, the lithium metal oxide particles may include 83 mol % or more, 85 mol % or more, 88 mol %, 90 mol % or more, or 95 mol % or more of nickel based on the total number of moles of all elements excluding lithium and oxygen. In the above range, a capacity of the lithium secondary battery may be more enhanced.

In some embodiments, the lithium metal oxide particles may include 83 mol % to 98 mol % of nickel based on the total number of moles of all elements excluding lithium and oxygen.

In some embodiments, the lithium metal oxide particles may contain 88 mol % to 98 mol % of nickel among all elements excluding lithium and oxygen.

If the content of nickel in the lithium metal oxide particles is increased, the capacity of the lithium secondary battery may be improved, but chemical stability may be degraded. However, the lithium secondary battery according to the exemplary embodiments may including the electrolyte solution as described above to have enhanced life-span and high temperature storage properties even when the lithium metal oxide particles having the high-nickel (80 mol % or more nickel) composition are used.

In an embodiment, the lithium metal oxide particles may contain less than 10 mol %, preferably 8 mol % or less, more preferably 6 mol % or less of manganese based on the total number of moles of all elements excluding lithium and oxygen. In the above range, the rapid charge life-span and high-temperature storage life-span properties of the lithium secondary battery may be further improved, and the increasing ratio of the high-temperature storage resistance may be lowered.

For example, if the content of manganese in the lithium metal oxide particles is 10 mol % or more, the high-temperature storage life-span properties when used with acetate-based compound may be decreased, and the increasing ratio of the high-temperature storage resistance may be increased.

In some embodiments, the lithium metal oxide particles may contain 0.5 mol % to 8 mol %, preferably 0.5 mol % to 6 mol % of manganese among all elements excluding lithium and oxygen.

In an embodiment, the lithium metal oxide particles may be represented by Chemical Formula 5.

$$Li_xNi_{(1-a-b)}Mn_aM_bO_y \quad \text{[Chemical Formula 5]}$$

In Chemical Formula 5, M may include at least one element selected from Co, Al, Zr, Ti, Cr, B, Mg, Ba, Si, Y, W and Sr, and $0.9 \le x \le 1.2$, $1.9 \le y \le 2.1$, $0 < a+b \le 0.2$, $0 < a < 0.1$.

In some embodiments, $0 < a+b \le 0.17$, $0 < a+b \le 0.15$, $0 < a+b \le 0.12$, $0 < a+b \le 0.1$, or $0 < a+b \le 0.05$.

In some embodiments, $0 < a \le 0.08$ or $0 < a \le 0.06$. In some embodiments, $0.005 \le a \le 0.08$ or $0.005 \le a \le 0.06$.

In an embodiment, the lithium metal oxide particles may further include a coating element or a doping element. For example, the coating element or doping element may include Al, Ti, Ba, Zr, Si, B, Mg, P, Sr, W, La, an alloy thereof, or an oxide thereof. In this case, the lithium secondary battery having more improved life-span properties may be implemented.

For example, the cathode binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 on the anode current collector 125.

The anode active material layer 120 may include an anode active material, may further include an anode binder and a conductive material.

For example, the anode active material may be mixed and stirred together with the anode binder, the conductive material in a solvent to form an anode slurry. The anode slurry may be coated on the anode current collector 125, dried and pressed to obtain the anode 130.

For example, the anode current collector 125 may include gold, stainless-steel, nickel, aluminum, titanium, copper or an alloy thereof, preferably, may include copper or a copper alloy.

The anode active material may include a material which may be capable of adsorbing and ejecting lithium ions. For example, the anode active material may include a lithium alloy, a carbon-based material, a silicon-based material, etc.

For example, the lithium alloy may include a metal element such as aluminum, zinc, bismuth, cadmium, antimony, silicon, lead, tin, gallium, indium, etc.

For example, the carbon-based active material may include a crystalline carbon, an amorphous carbon, a carbon complex, a carbon fiber, etc.

The amorphous carbon may include, e.g., a hard carbon, cokes, a mesocarbon microbead (MCMB) fired at a temperature of 1500° C. or less, a mesophase pitch-based carbon fiber (MPCF), etc. These may be used alone or in a combination thereof.

The crystalline carbon may include, e.g., an artificial graphite, natural graphite, graphitized cokes, graphitized MCMB, graphitized MPCF, etc. These may be used alone or in a combination thereof.

In an embodiment, the anode active material may include the silicon-based active material. The silicon-based active material may include, e.g., Si, $SiO_x$(0<x<2), Si/C, SiO/C, Si-metal, etc. In this case, the lithium secondary battery having a high capacity may be implemented.

For example, when the anode active material includes the silicon-based active material, a battery thickness may be increased due to a volume expansion of the silicon-based active material during repeated charging and discharging. However, the electrolyte solution for a lithium secondary battery according to the above-described exemplary embodiments may be employed so that the volume expansion of the lithium secondary battery may be suppressed or alleviated. Further, the high-temperature storage life-span properties of the lithium secondary battery may be improved, and the increasing ratio of the high-temperature storage resistance may be lowered.

In some embodiments, a content of silicon atoms in the anode active material may be in a range from 1 wt % to 20 wt %, or from 1 wt % to 10 wt %.

The anode binder and the conductive material substantially the same as or similar to the cathode binder and the conductive material as mentioned above may also be used in the anode. In some embodiments, the anode binder may include, e.g., an aqueous binder such as styrene-butadiene rubber (SBR). Further, the anode binder may be used together with a thickener such as carboxymethyl cellulose (CMC).

A separation layer 140 may be interposed between the cathode 100 and the anode 130.

In some embodiments, an area of the anode 130 may be greater than that of the cathode 100. Thus, lithium ions generated from the cathode 100 may be easily transferred to the anode 130 without a loss by, e.g., precipitation or sedimentation.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

The lithium secondary battery according to exemplary embodiments may include a cathode lead 107 connected to the cathode 100 to protrude to an outside of a case 160, and an anode lead 127 connected to the anode 130 to protrude to the outside of the case 160.

For example, the cathode lead 107 may be electrically connected to the cathode current collector 105. The anode lead 130 may be electrically connected to the anode current collector 125.

For example, the cathode current collector 105 may include a protrusion (a cathode tab, not illustrated) at one side thereof. The cathode active material layer 110 may not be formed on the cathode tab. The cathode tab may be integral with the cathode current collector 105 or may be connected to the cathode current collector 105 by, e.g., welding. The cathode current collector 105 and the cathode lead 107 may be electrically connected via the cathode tab.

The anode current collector 125 may include a protrusion (an anode tab, not illustrated) at one side thereof. The anode active material layer 120 may not be formed on the anode tab. The anode tab may be integral with the anode current collector 125 or may be connected to the anode current collector 125 by, e.g., welding. The anode electrode current collector 125 and the anode lead 127 may be electrically connected via the anode tab.

In an embodiment, the electrode assembly 150 may include a plurality of the cathodes and a plurality of the anodes. For example, the cathode and the anode may be alternately arranged, and the separation layer may be interposed between the cathode and the anode. Accordingly, the lithium secondary battery according to an embodiment of the present invention may include a plurality of the cathode tabs and a plurality of the anode tabs protruding from the plurality of the cathodes and the plurality of the anodes, respectively.

In an embodiment, the cathode tabs (or the anode tabs) may be laminated, pressed and welded to form a cathode tab stack (or an anode tab stack). The cathode tab stack may be electrically connected to the cathode lead 107. The anode tab stack may be electrically connected to the anode lead 127.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

(1) Preparation of Electrolyte

A 1M $LiPF_6$ solution was prepared using a mixed solvent having the composition shown in Table 1 below. Based on a total weight of the electrolyte, 1 wt % of fluoroethylene carbonate (FEC) (2 wt % in Example 5 and Comparative Example 8) and 0.5 wt % of 1,3-propane sultone (PS) were added to the $LiPF_6$ solution and mixed to prepare an electrolyte solution.

(2) Preparation of Lithium Secondary Battery Sample

Lithium metal oxide particles having the composition as shown in Table 1 below, carbon black and polyvinylidene fluoride (PVdF) were dispersed in NMP in a weight ratio of 98:1:1 to prepare a cathode slurry.

The cathode slurry was uniformly coated on an an aluminum foil (thickness: 12 μm), and then dried and pressed to form a cathode.

An anode slurry was prepared by mixing an anode active material having the composition as shown in Table 1 below, carbon black, styrene-butadiene rubber (SBR) and carboxymethyl cellulose (CMC) in a distilled water by a weight ratio of 96:3:1:1.

The anode slurry was uniformly coated on a copper foil (thickness: 8 μm), and then dried and pressed to form an anode.

The cathodes and the anode were alternately and repeatedly stacked with a polyethylene separator (thickness: 13 μm) interposed therebetween to form an electrode assembly.

The electrode assembly was accommodated in a pouch, and the electrolyte solution was injected and sealed to obtain a lithium secondary battery sample having a capacity level of 2Ah.

Examples 2 to 5, and Comparative Examples 1 to 8

Lithium secondary battery samples were prepared by the same method as that in Example 1, except that compositions of the mixed solvent and the lithium metal oxide particles were changed as shown in Table 1 below.

TABLE 1

| | lithium metal oxide | anode active material | lithium salt of electrolyte solution | mixed solvent of electrolyte solution |
|---|---|---|---|---|
| Example 1 | $LiNi_{0.88}Co_{0.06}Mn_{0.06}O_2$ | AG + NG 7:3(w/w) | 1M $LiPF_6$ | EC + EMC + EA 25:70:5(v/v) |
| Example 2 | $LiNi_{0.88}Co_{0.06}Mn_{0.06}O_2$ | AG + NG 7:3(w/w) | 1M $LiPF_6$ | EC + EMC + PA 25:70:5(v/v) |
| Example 3 | $LiNi_{0.88}Co_{0.06}Mn_{0.06}O_2$ | AG + NG 7:3(w/w) | 1M $LiPF_6$ | EC + EMC + EA 25:65:10(v/v) |
| Example 4 | $LiNi_{0.88}Co_{0.06}Mn_{0.06}O_2$ | AG + NG 7:3(w/w) | 0.7M $LiPF_6$ 0.3M LiFSI | EC + EMC + EA 25:70:5(v/v) |
| Example 5 | $LiNi_{0.88}Co_{0.06}Mn_{0.06}O_2$ | AG + $SiO_x$ 95:5(w/w) | 1M $LiPF_6$ | EC + EMC + EA 25:70:5(v/v) |
| Comparative Example 1 | $LiNi_{0.88}Co_{0.06}Mn_{0.06}O_2$ | AG + NG 7:3(w/w) | 1M $LiPF_6$ | EC + EMC 25:75(v/v) |
| Comparative Example 2 | $LiNi_{0.88}Co_{0.06}Mn_{0.06}O_2$ | AG + NG 7:3(w/w) | 1M $LiPF_6$ | EC + EMC + EA 25:60:15(v/v) |
| Comparative Example 3 | $LiNi_{0.88}Co_{0.06}Mn_{0.06}O_2$ | AG + NG 7:3(w/w) | 1M $LiPF_6$ | EC + EMC + EP 25:70:5(v/v) |
| Comparative Example 4 | $LiNi_{0.88}Co_{0.06}Mn_{0.06}O_2$ | AG + NG 7:3(w/w) | 1M $LiPF_6$ | EC + EMC + MB 25:70:5(v/v) |
| Comparative Example 5 | NCM811 + NCM523 (6:4 w/w) | AG + NG 7:3(w/w) | 1M $LiPF_6$ | EC + EMC 25:75(v/v) |
| Comparative Example 6 | NCM811 + NCM523 (6:4 w/w) | AG + NG 7:3(w/w) | 1M $LiPF_6$ | EC + EMC + EA 25:70:5(v/v) |
| Comparative Example 7 | NCM811 + NCM523 (6:4 w/w) | AG + NG 7:3(w/w) | 1M $LiPF_6$ | EC + EMC + EP 25:70:5(v/v) |
| Comparative Example 8 | $LiNi_{0.88}Co_{0.06}Mn_{0.06}O_2$ | AG + $SiO_x$ 95:5(w/w) | 1M $LiPF_6$ | EC + EMC 25:75(v/v) |

NCM811: $LiNi_{0.8}Co_{0.1}Mn_{0.1}O_2$
NCM523: $LiNi_{0.5}Co_{0.2}Mn_{0.3}O_2$
AG: Artificial graphite
NG: Natural graphite
LiFSI: $LiN(SO_2F)_2$
EC: Ethylene carbonate
EMC: Ethyl methyl carbonate
EA: Ethyl acetate
PA: Propyl acetate
EP: Ethyl propionate
MB: Methyl butyrate Experimental Example 1

Evaluation on Rapid Charging Life-Span Property

The lithium secondary batteries of Examples and Comparative Examples were charged by 0.33 C up to a state of charge (SOC) of 8%, charged by a stepwise manner of 2.5 C-2.25 C-2 C-1.75 C-1.5 C-1.0 C in an interval of SOC 8% to 80%, charged again by 0.33 C (4.2V, 0.05C cut-off) in the SOC 80-100% section, and then CC-discharged by 0.33 C to 2.7V.

An initial discharge capacity A1 was measured, and the charge and discharge cycle were repeated 100 times to measure a discharge capacity A2 in the 100th cycle.

A rapid charge capacity retention was calculated as follows.

Rapid charge capacity retention (%)=$A2/A1\times100$(%)

Experimental Example 2

Evaluation on High-Temperature Storage Property (1) Evaluation on Capacity Retention (Ret.)

The lithium secondary batteries of Examples and Comparative Examples were 0.5 C CC/CV charged (4.2V, 0.05 C CUT-OFF), and then 0.5 C CC discharged (2.7V CUT-OFF) 3 times.

A discharge capacity in the 3rd cycle was expressed as an initial capacity B1 of the lithium secondary battery.

The charged lithium secondary batteries of Examples and Comparative Examples were left for 10 weeks under an atmospheric exposure condition at 60° C., additionally left for 30 minutes at room temperature, and then 0.5 C CC discharged (2.7V CUT-OFF) to measure a discharge capacity B2.

A capacity retention after high-temperature storage was calculated as follows.

Capacity retention after high temperature storage (%)=$B2/B1\times100$(%)

(2) Evaluation on Increasing Ratio of Internal Resistance (DCIR)

The lithium secondary batteries of Examples and Comparative Examples were charged under condition of 0.5 C CC/CV (4.2V 0.05 C CUT-OFF) at 25° C., and then discharged under conditions of 0.5 C CC to SOC 60%.

At the SOC 60%, C-rate was changed to 0.2 C, 0.5 C, 1.0 C, 1.5 C, 2.0 C and 2.5 C, and an initial DCIR D1 was measured while discharging and supplementing charging for 10 seconds at each C-rate.

The charged lithium secondary batteries of Examples and Comparative Examples were left to be exposed to air at 60° C. for 10 weeks, and then further left at room temperature for 30 minutes. Thereafter, a DCIR D2 was measured by the same manner as described above.

An increasing ratio of DCIR was calculated as follows.

$$\text{Increasing ratio of DCIR } (\%)=(D2-D1)/D1\times 100(\%)$$

TABLE 2

| | initial DCIR (mΩ) | rapid charging capacity retention (%) | high-temperature storage capacity retention (%) | increasing ratio of resistance after high-temperature storage (%) |
|---|---|---|---|---|
| Example 1 | 32.8 | 92.3 | 86 | 24.7 |
| Example 2 | 34.3 | 91.7 | 86.2 | 23.9 |
| Example 3 | 30.8 | 93.5 | 85.9 | 30 |
| Example 4 | 32.5 | 94.8 | 86.8 | 16.7 |
| Example 5 | 30.7 | 88 | 70.9 | 45.9 |
| Comparative Example 1 | 34.6 | 90.3 | 83.3 | 30.9 |
| Comparative Example 2 | 32.5 | 93 | 80.8 | 51.8 |
| Comparative Example 3 | 33.6 | 93.2 | 79.7 | 37.4 |
| Comparative Example 4 | 33.8 | 93.5 | 80.2 | 29.8 |
| Comparative Example 5 | 34.2 | — | 81.5 | 33.7 |
| Comparative Example 6 | 35 | — | 79.1 | 43.5 |
| Comparative Example 7 | 36.1 | — | 78.6 | 47.6 |
| Comparative Example 8 | 32.5 | 85.9 | 70.5 | 58 |

Referring to Table 2, the lithium secondary batteries of Examples had low initial resistance (DCIR) and reduced increasing ratio of resistance after the high-temperature storage resistance, and provided improved rapid charging capacity retention rate and high temperature storage capacity retention.

The invention claimed is:

1. A lithium secondary battery, comprising:
a cathode comprising a cathode active material that comprises lithium metal oxide particles;
an anode facing the cathode and comprising an anode active material; and
an electrolyte solution comprising a lithium salt and an organic solvent,
wherein the lithium metal oxide particles contain at least 80 mol % of nickel and less than 10 mol % of manganese among all elements excluding lithium and oxygen, and
the organic solvent comprises an acetate-based compound represented by Chemical Formula 1 in an amount from 1 vol % to 5 vol % based on a total volume of the organic solvent,
wherein the organic solvent further comprises a cyclic carbonate-based solvent and a linear carbonate-based solvent,
wherein a volume ratio of the cyclic carbonate-based solvent to the acetate-based compound in the organic solvent is in a range from 2.5 to 25:

[Chemical Formula 1 ]

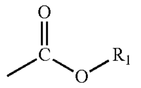

wherein, in Chemical Formula 1, $R_1$ represents a $C_1$-$C_{10}$ alkyl group, a $C_2$-$C_{10}$ alkenyl group, a $C_3$-$C_{12}$ cycloalkyl group, or a $C_5$-$C_{12}$ cycloalkenyl group.

2. The lithium secondary battery of claim 1, wherein the lithium metal oxide particles contain 88 mol % to 98 mol % of nickel among all elements excluding lithium and oxygen.

3. The lithium secondary battery of claim 1, wherein the lithium metal oxide particles contain 0.5 mol % to 7 mol % of manganese among all elements excluding lithium and oxygen.

4. The lithium secondary battery of claim 1, wherein the lithium salt comprises a fluorine-containing sulfonyl imide-based lithium salt represented by Chemical Formula 2:

[Chemical Formula 2]

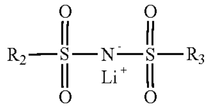

wherein, in Chemical Formula 2, $R_2$ and $R_3$ are independently fluorine or a fluorine-substituted $C_1$-$C_6$ alkyl group.

5. The lithium secondary battery of claim 1, wherein, in Chemical Formula 1, $R_1$ is a $C_1$-$C_6$ alkyl group.

6. The lithium secondary battery of claim 1, wherein a content of the linear carbonate-based solvent in the organic solvent is greater than a content of the cyclic carbonate-based solvent.

7. The lithium secondary battery of claim 1, wherein the electrolyte solution further comprises an additive comprising at least one of a fluorine-containing cyclic carbonate-based compound represented by Chemical Formula 3 and a sultone-based compound represented by Chemical Formula 4:

[Chemical Formula 3]

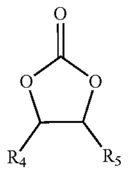

wherein, in Chemical Formula 3, $R_4$ and $R_5$ are independently hydrogen, halogen, or a $C_1$-$C_3$ alkyl group, and at least one of $R_4$ and $R_5$ is F,

[Chemical Formula 4]

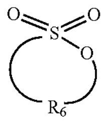

wherein, in Chemical Formula 4, $R_6$ is a $C_2$-$C_5$ alkylene group or a $C_3$-$C_5$ alkenylene group.

8. The lithium secondary battery of claim 7, wherein a content of the additive is in a range from 0.1 wt % to 5 wt % based on a total weight of the electrolyte solution.

9. The lithium secondary battery of claim 7, wherein a content of the fluorine-containing cyclic carbonate-based compound is in a range from 0.1 wt % to 2 wt % based on a total weight of the electrolyte solution, and a content of the sultone-based compound is in a range from 0.1 wt % to 1 wt % based on the total weight of the electrolyte solution.

10. The lithium secondary battery of claim 1, wherein the anode active material comprises a silicon-based active material.

11. The lithium secondary battery of claim 10, wherein a content of silicon atoms in the anode active material is in a range from 1 wt % to 20 wt %.

* * * * *